United States Patent
Szukala et al.

(10) Patent No.: US 6,801,849 B2
(45) Date of Patent: Oct. 5, 2004

(54) ENGINE DIAGNOSTIC VIA PDA

(75) Inventors: Les Szukala, Ingleside, IL (US); Scott Koerner, Kenosha, WI (US); Dell Francis, Bristol, WI (US)

(73) Assignee: Bombardier Recreational Products Inc., Saint-Bruno (CA)

( * ) Notice: Subject to any disclaimer, the term of this patent is extended or adjusted under 35 U.S.C. 154(b) by 0 days.

(21) Appl. No.: 10/092,717

(22) Filed: Mar. 8, 2002

(65) Prior Publication Data

US 2003/0014179 A1 Jan. 16, 2003

Related U.S. Application Data

(60) Provisional application No. 60/304,762, filed on Jul. 13, 2001, and provisional application No. 60/330,634, filed on Oct. 26, 2001.

(51) Int. Cl.$^7$ .............................................. G01M 15/00

(52) U.S. Cl. ...................................... 701/114; 701/115

(58) Field of Search ................................ 701/114, 115, 701/32, 33

(56) References Cited

U.S. PATENT DOCUMENTS

| | | | |
|---|---|---|---|
| 5,318,449 A | 6/1994 | Schoell et al. .............. 434/305 |
| 6,141,608 A | 10/2000 | Rother ......................... 701/33 |
| 6,304,814 B1 | 10/2001 | Masters et al. ............. 701/110 |
| 6,330,499 B1 | 12/2001 | Chou et al. .................... 701/33 |
| 6,360,161 B1 | 3/2002 | Francis et al. .............. 701/115 |
| 6,370,454 B1 * | 4/2002 | Moore ......................... 701/33 |

OTHER PUBLICATIONS

International Search Report dated Oct. 1, 2002 for PCT/US02/21592.

* cited by examiner

Primary Examiner—Andrew M. Dolinar
(74) Attorney, Agent, or Firm—BRP Legal Services

(57) ABSTRACT

An arrangement is provided for engine diagnostic via PDA. An engine diagnostic system, realized on a PDA, presents a menu to a user with a plurality of options related to engine diagnostic operations through a user graphical interface. The PDA is in connection with an engine management mechanism of an engine. The user makes a selection of an engine diagnostic operation to be performed with respect to the engine. The engine diagnostic system performs the selected engine diagnostic operation through the engine management mechanism of the engine.

50 Claims, 10 Drawing Sheets

ENGINE DIAGNOSTIC VIA PDA

APPLICATION DATA

This application relates to and claims priority from U.S. Patent Application No. 60/304,762, titled "Engine Diagnostic Software," filed Jul. 13, 2001, and U.S. Patent Application No. 60/330,634, titled "Engine Diagnostic VIA PDA," filed Oct. 26, 2001, the contents of both provisional applications are incorporated herein by reference.

BACKGROUND

Aspects of the present invention relate to engine diagnostic and testing. Other aspects of the present invention relate to devices that facilitate engine diagnostic and testing.

With advancements of technologies, engines used in moving vehicles are more and more built not just as a mechanical piece but combined with electronics that act as a coherent part of the engines to automate various tasks. Typically, such electronics are often powered to, for example, perform different computations, maintain engine's operating parameters, control an engine's operational behavior, and to facilitate other functions such as engine status checking, trouble shooting, diagnosing, or testing. For example, when a car is sent to a dealer to have maintenance services, to get an idea about the car's condition, a technician may connect an engine diagnostic system with the engine management module (electronics inside of an engine) of the car, to obtain various types of status information about the engine of the car. If the status information reveals a potential problem associated with the engine, the technician may further perform different tests on the car's engine to determine or diagnose the cause of the potential problem.

Such diagnostic operations are facilitated by an engine diagnostic system, which allows a user (e.g., a car repair technician) to specify desired operations to be performed and then executes the user specified operations via the engine management module of the engine. To do so, such an engine diagnostic system is capable of communicating with the engine management module inside of an engine. For example, desired operations include inquiring relevant status information of the engine or controlling the engine's operations by, for example, configuring the engine's operating parameters managed by the engine management module.

Different engine diagnostic systems have been developed for assisting diagnostic tasks performed on engines of various types of vehicles. For example, such systems may be developed for engines in automobiles as well as for engines used in recreational vehicles such as a boat. Existing engine diagnostic systems are implemented in different platforms. For example, an engine diagnostic system may either be realized on a specialized platform as a special purpose system or implemented on a general platform such as a personal computer as an application. There are various problems associated with existing engine diagnostic systems. For example, for sustained use, they require power lines that are hard wired to power plugs because the time period a battery permit is typically very limited. In many scenarios such as outdoor uses of an engine diagnostic system for a recreational vehicle (e.g., a boat), requiring a hard wired power line is often limit and inefficient.

When an engine diagnostic system is implemented on a general purpose personal computer or a laptop, the light crystal display screens used in such computers are usually not suitable for viewing information under outdoor day light conditions. In addition, since a personal computer or a laptop is designed for general purpose, it often takes longer time to start an engine diagnostic system implemented as one of many applications running on the same personal computer. In addition to platform related issues, existing engine diagnostic systems do not provide certain functions that allow users to perform some essential and important operations on an underlying engine. For example, each engine is associated with an injector whose performance may sometimes need to be adjusted during trouble shooting. Adjustment may need to be made while the engine is running. As another example, an engine map managed by an engine management module to control the engine behavior may sometimes need to be replaced when a new version of the engine map is approved by the environmental protection agency (EPA) and is required to replace all previously installed engine maps. Furthermore, other problems associated with existing engine diagnostic systems related to their weight (often too heavy) and size (too big) for portable uses.

BRIEF DESCRIPTION OF THE DRAWINGS

The present invention is further described in terms of exemplary embodiments, which will be described in detail with reference to the drawings. These embodiments are non-limiting exemplary embodiments, in which like reference numerals represent similar parts throughout the several views of the drawings, and wherein:

FIGS. 14(a)–4(b) show exemplary graphical user interfaces for EMM reporting, according to an embodiment of the present invention.

DETAILED DESCRIPTION

The invention is described below, with reference to detailed illustrative embodiments. It will be apparent that the invention can be embodied in a wide variety of forms, some of which may be quite different from those of the disclosed embodiments. Consequently, the specific structural and functional details disclosed herein are merely representative and do not limit the scope of the invention.

The processing described below may be performed by a properly programmed general-purpose computer alone or in connection with a special purpose computer. Such processing may be performed by a single platform or by a distributed processing platform. In addition, such processing and functionality can be implemented in the form of special purpose hardware or in the form of software being run by a general-purpose computer. Any data handled in such processing or created as a result of such processing can be stored in any memory as is conventional in the art. By way of example, such data may be stored in a temporary memory, such as in the RAM of a given computer system or subsystem. In addition, or in the alternative, such data may be stored in longer-term storage devices, for example, magnetic disks, rewritable optical disks, and so on. For purposes of the disclosure herein, a computer-readable media may comprise any form of data storage mechanism, including such existing memory technologies as well as hardware or circuit representations of such structures and of such data.

Figure 1:
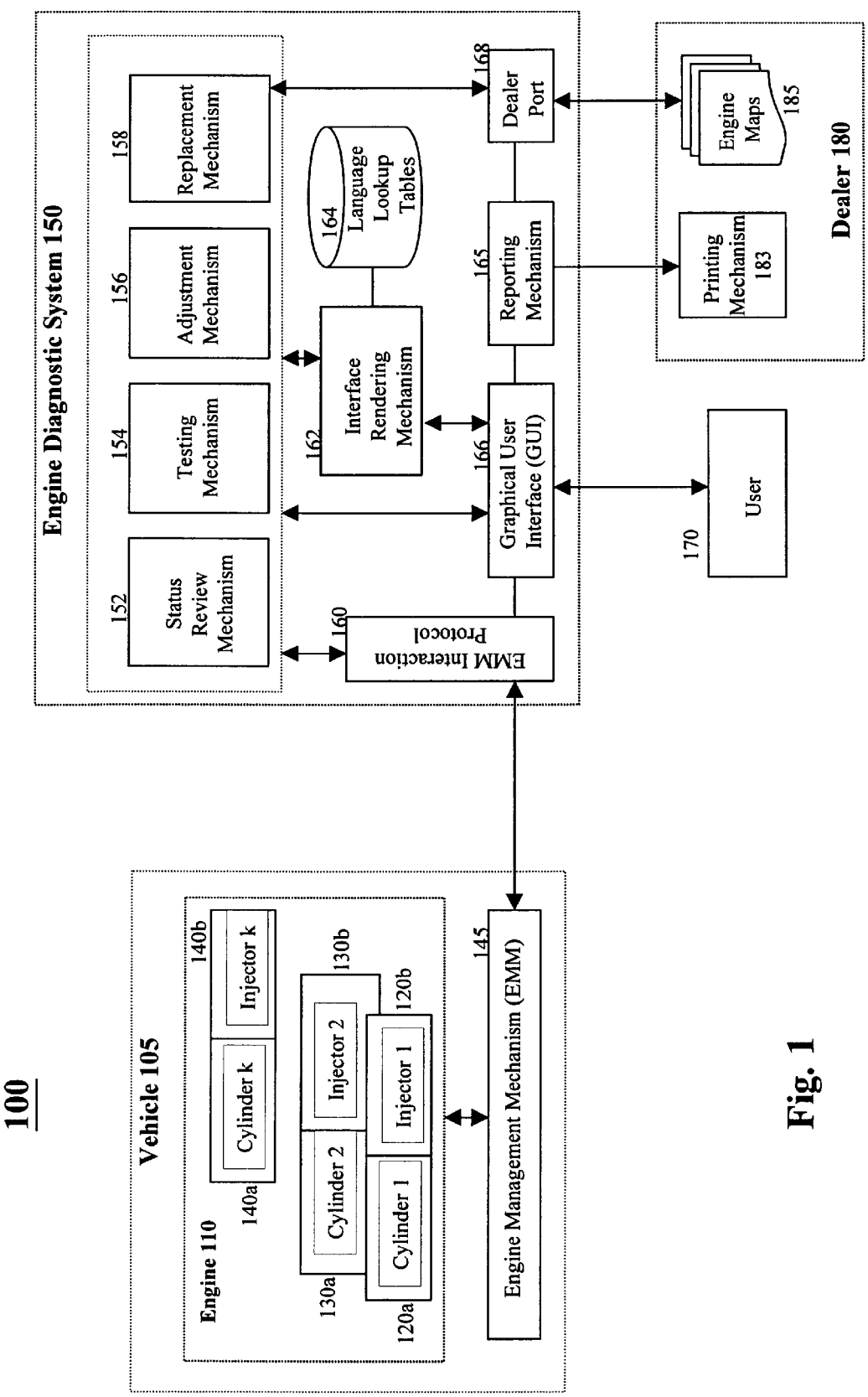
FIG. 1 depicts a high-level architecture of a mechanism, in which an engine diagnostic system, interfacing with a user and an engine management mechanism, facilitates the user to perform diagnostic related control on an engine, according to embodiments of the present invention.

FIG. 1 depicts a high-level architecture of a framework 100, in which an engine diagnostic system 150, interfacing with a user 170 and an engine management mechanism (EMM) 145, facilitates the user 170 to perform diagnostic related controls over an engine 110 of a vehicle 105, according to embodiments of the present invention. In the vehicle 105, the engine 110 may include one or more cylinders 120a, 130a, . . . , 140a, each of which has an injector 120b, 130b, . . . , 140b. The engine management mechanism 145 in the vehicle 105 manages the engine 110. The EMM 145 may store parameters based on which the engine 110 should be operated. For example, the performance of a fuel injector 120b, 130b, . . . ,140b can be specified by a set of coefficients corresponding to a third-order polynomial curve. Such coefficients can be stored in the EMM 145 to control the operation of a fuel-injected engine.

The EMM 145 may also collect and store other information associated with the engine 110. For example, the EMM 145 may record static information about the engine 110 such as the engine's model, the engine's serial number, and the date on which the engine 110 is manufactured. The EMM 145 may also monitor the performance of the engine 110 and gather data that reflects the dynamics of the engine 110. For example, the EMM 145 may record the engine's temperature, injector voltage, and ignition timing information.

The EMM 145 may control the performance of the engine 110 by, for example, changing the operational parameters. For instance, by resetting the coefficients of an injector, the EMM 145 may control how the injector is to behave. The EMM 145 may also change the behavior of the engine 110 by replacing the engine map stored therein.

In framework 100, the engine diagnostic system 150 interacts with both the user 170 and the EMM 145 to control the engine 110 through the EMM 145 according to the user's specifications. The interaction between the engine diagnostic system 150 and the EMM 145 may be conducted via a generic connection, including a hardwired connection such as a cable connection or a wireless connection where the interaction may be based on, for example, short-range radio frequency or infrared.

The user 170 may correspond to a dealer of the vehicle 105 or an end user of the vehicle 105 or a service technician. The user 170 utilizes the engine diagnostic system 150 to inspect, diagnose, maintain, and control the engine 110. The engine diagnostic system 150 may be configured accordingly to the role of the user (dealer or end user) to facilitate different needs of the user 170. For example, when the user 170 is an end user, the engine diagnostic system may provide only engine status review functionality instead of testing or modification functionality.

In preferred embodiments of this invention, the engine diagnostic system (EDS) 150 comprises a graphical user interface 166, an EMM interaction protocol 160, an interface rendering mechanism 162, a plurality of language lookup tables 164, a status review mechanism 152, a testing mechanism 154, an adjustment mechanism 156, a replacement mechanism 158, a reporting mechanism 165, and a dealer port 168. The engine diagnostic system 150 may be implemented in hardware, software, or firmware on a platform that is appropriate, including, preferably, on a personal data assistant (PDA). The EDS 150 may also be implemented on other platforms such as a laptop, a personal computer, or other types of hand held devices. According to the preferred embodiment of the present invention, the present invention is described based on a preferred implementation on PDA platform.

The engine diagnostic system 150 interacts with the user 170 via the user graphical interface 166, acquiring the user's specifications. The user's specification may include a language preference, a selection of a particular type of engine-related information that the user desires to review, or a specific test that the user desires to perform on the engine 110.

Based on the user's specification, the engine diagnostic system 150 invokes an appropriate internal mechanism to process the user's specification and communicates with the EMM 145 to execute the user's specified operations. For example, if the user 170 specifies Spanish as the preferred language, the engine diagnostic system 150 may accordingly invoke the interface rendering mechanism 162 to process the user's selection to render the user graphical interface 166 in Spanish. If the user selects to review dynamic engine status information, the engine diagnostic system 150 will invokes the status review mechanism 152 to process the request, to query the EMM 145 for dynamic status information, and to render such information, in the preferred language, on the user graphical interface 166.

Through the user graphical interface 166, the engine diagnostic system 150 presents the user 170 with different options to control the engine 110. The options may be presented to the user 170 in a hierarchical fashion. For example, there may be a plurality of categories of options such as engine status review, engine testing, adjustment, and replacement. Each category may further include a plurality of choices and sub-choices. The status review category may include static information review and dynamic information review. Similarly, the testing category may include both static testing and dynamic testing options. In general, the user graphical interface 166 may present the user 170 the higher level of categories and then narrow down the specific choices.

Figure 2:
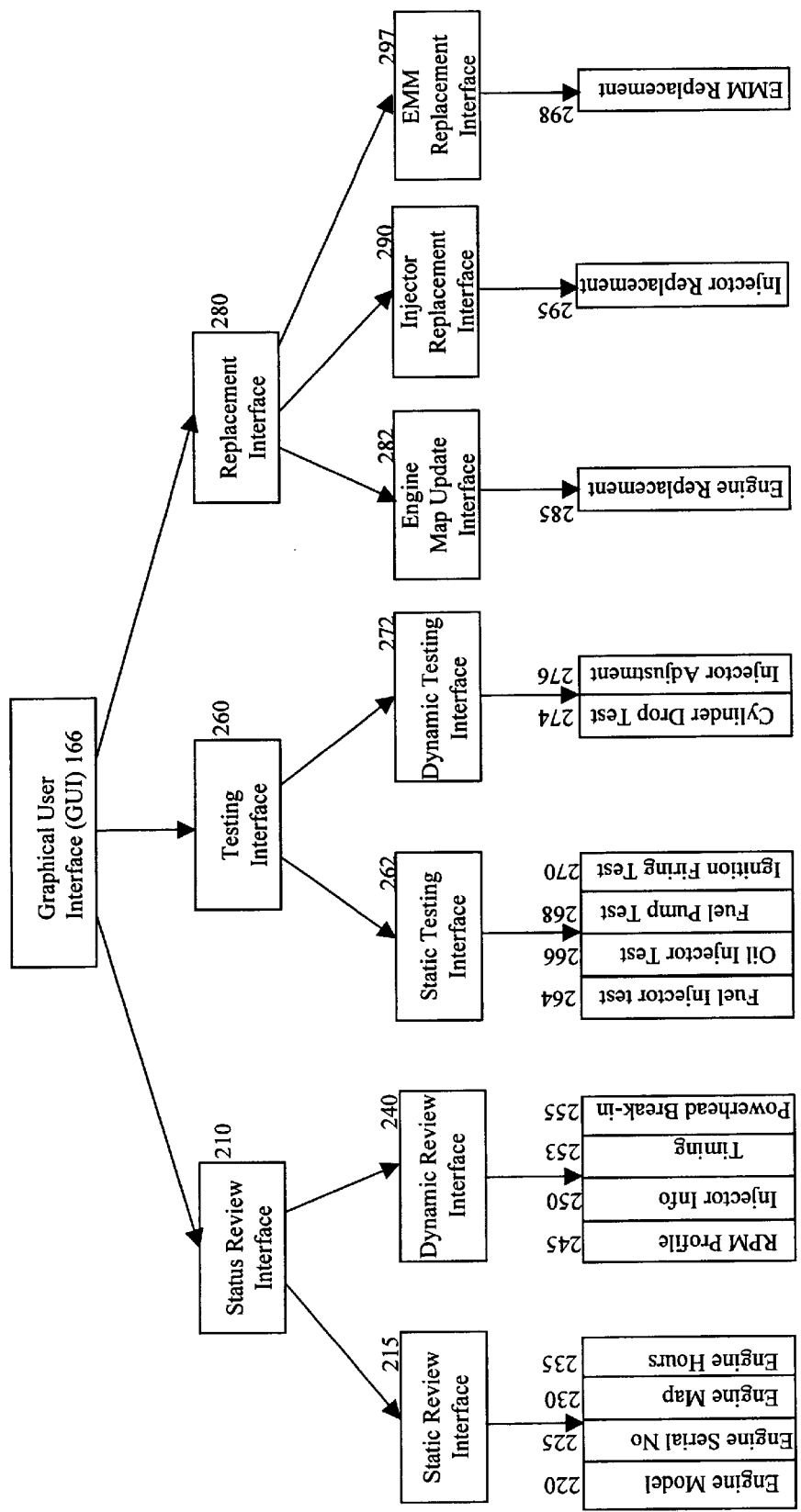
FIG. 2 shows exemplary relationships between various graphical user interfaces and functionalities that an engine diagnostic system can perform in controlling an engine, according to embodiments of the present invention.

FIG. 2 shows exemplary relationships between various graphical user interfaces and functionalities that the engine diagnostic system 150 can perform, according to embodiments of the present invention. The user graphical interface 166 may comprise a plurality of types of interfaces, corresponding to the functionalities that it offers to the user 170. For example, GUI 166 may include a category of status review interface 210, a category of testing interface 260, and a category of replacement interface 280. The category of status review interface 210 may further comprise a category of static status review interface 215 and a category of dynamic status review interface 240. Similarly, the category of testing interface 260 may further comprise a category of static testing interface 262 and a category of dynamic testing interface 272. The category of replacement interface 280 further comprises a category of engine map update interface 282, a category of injector replacement interface 290, and a category of engine management mechanism replacement interface 297.

Each category of interface, as depicted in FIG. 2, may associate with certain functionalities that the engine diagnostic system 150 provides. For example, the category of static status review interface 215 may include all the interfaces, which present static status information (corresponding to the functionality of static status review) about the engine 110 to the user 170. The category of injector replacement interface 290 may display instructions associated with replacing an injector (corresponding to the functionality to replace an injector) to the user 170 and allow the user 170 to follow a set of actions in a predetermined sequence in order to properly replace an injector in the engine 110.

As illustrated in FIG. 2, the static status review interface 215 displays static status information, including engine model information 220, engine serial number 225, engine map 230, and engine hours 235. The dynamic status review interface 240 displays dynamic status information, which may include but not limited to: rotation per minute (RPM) profile 245, injector information 250, timing verification information 253, and powerhead break-in information 255. The category of static testing interface 262 may be associated with the functionalities of fuel injector test 264, oil injector test 266, fuel pump test 268, and ignition firing test 270. The category of dynamic testing interface 272 may be associated with the functionalities of cylinder drop test 274 and injector adjustment 276. Furthermore, the engine map update interface 282 is associated with the functionality of engine replacement 285, the injector replacement interface 290 is associated with the functionality of injector replacement 295, and the EMM replacement interface 297 is associated with the functionality of EMM replacement 298.

The selections made by the user 170 via the user graphical interface 166 are processed by appropriate mechanisms in the engine diagnostic system 150. Referring to FIG. 1, based on the user's selections, the user graphical interface 166 directs the processing appropriately. For example, if the user 170 desires to review the dynamic operational status information about the engine 110 and makes a corresponding selection via the user graphical interface 166, the status review mechanism 152 is invoked to process the request. The status review mechanism 152 may identify the specific information that the user 170 requested, query the EMM 145 about such information, and then invoke the interface rendering mechanism 162 to render the queried information in a specified language. Upon receiving the queried information, the interface rendering mechanism may utilize the language look-up tables 164 to determine how to render the query results.

According to the present preferred embodiment of the invention, the engine diagnostic system 150 includes a plurality of mechanisms (152, 154, 156, 158) that are responsible for responding to specific user's requests. These mechanisms interact with the user graphical interface 166 to determine a user's request and then interact with the EMM 145 through the EMM interaction protocol 160 to carry out the requested operations. Depending on the nature of the connection between the engine diagnostic system 150 and the EMM 145 (e.g., physical connection or wireless connection such as short range radio frequency and infrared), the EMM interaction protocol 160 may support appropriate protocol that enables the communications between the EMM 145 and the engine diagnostic system 150. For example, the EMM interaction protocol 160 may support a signaling based protocol if the connection between the EMM 145 and the engine diagnostic system 150 is a wireless connection via short range radio frequency.

The status review mechanism 152 processes the user's request for status information. Based on the specific type(s) of information requested, the status review mechanism 152 interacts with the EMM 145, querying the requested information. Such information may be static or dynamic.

The testing mechanism 154 processes the user's request for testing the engine 110. Such testing may be static testing or dynamic testing. A static test on the engine 110 may include any test that does not require the engine 110 to be running. On the other hand, a dynamic test may refer to a test performed on a running engine under certain condition. One such condition may be that the engine 110 is running with a speed above 500 RPM. There may be a plurality of testing choices and the user 170 may make the selection via the user graphical interface 166. For example, the user 170 may specify to perform a cylinder drop testing under dynamic testing option.

The testing mechanism 154 carries out the user's selection of testing. Based on the selection, it may further acquire testing parameters from the user 170 and use such parameters to control the engine 110 during testing. Furthermore, testing mechanism 154 may gather the information about the operational status of the engine 110 under the performed test and report such information back to the user 170 via the user graphical interface 166. For example, if the user 170 desires to perform a cylinder drop test, it may be necessary to acquire parameters such as which cylinder(s) to drop, in what order, if multiple cylinders are subject to the test, and in what fashion. Based on user specified parameters (or default testing parameters), the testing mechanism 154 communicates with the EMM 145 to control the testing. Similarly, information related to the testing results may be further collected from the EMM 145 and displayed via the user graphical interface 166 to the user 170.

The adjustment mechanism 156 is responsible for handling a user's request for adjusting the operational parameters of certain components of the engine 110. The user 170 may desire to adjust a particular cylinder or a particular injector and may so specify through the user graphical interface 166. For example, the user 17 may wish to increase the injector pulse width of a particular injector by incrementing the time interval. This may be achieved by first selecting the injector and then pressing a increment button (each pressing may correspond to, for example, a pulse width of 5 microsecond). This will be shown in detail below in referring to FIG. 12.

The replacement mechanism 158 is responsible for handling a user's request to replace a component in the engine 110. Such a component may include, for example, an injector, an engine map, or the EMM 145. The replacement mechanism 158 may interact with the user 170, via the user graphical interface 166, to obtain detailed information about which component is to be replaced. Based on the user's request, the replacement mechanism 158 may invoke certain replacement procedure. For example, to replace an engine map, the existing map may be required to be uploaded first from the EMM 145 to the engine diagnostic system 150. A new map is then downloaded from a dealer via the dealer port 168 to the engine diagnostic system 150, which is further downloaded into the EMM 145 to replace the previous map. The copy of the existing map (to be replaced) may be stored in case that the original map needs to be restored. Therefore, restoring a map may also be treated as a replacement operation.

The dealer port 168 is responsible for communicating with the dealer 180, for example, to obtain an engine map. The dealer 180 is authorized to distribute engine maps 185. Engine maps 185 may be distributed in a controlled fashion. For example, each engine map may be updated according to the new technical development associated with the underlying engine products and may be required to be approved by the Environmental Protection Agency (EPA). The engine maps 185 may also be distributed only to authorized requesters. The dealer port 168 may need to present certain identification for authentication purposes.

The dealer 180 may distribute engine maps in variety of ways. For example, a web site may be set up, which allows access to engine maps only by persons with certain credential (e.g., a recognized dealer registration identification). To obtain an engine map, the dealer port 168 may present required credential prior to download the desired map. An engine map may also be distributed via other means such as a file containing an engine map stored on a computer readable medium such as a floppy disk or a CD-ROM. All files are encrypted when received by the dealer. Decryption of the files is done within the 160 and 145 connection.

The reporting mechanism 165 in FIG. 1 is responsible for printing various types of information via a printing mechanism 183 in the dealer 180. The user 170 may choose, trough the user graphical interface 166, to save, for example, all static engine information to a file and then print the content of the file via the printing mechanism 183. A printer may be connected to the printing mechanism 183 associated with, for example, a host computer of the dealer 180. The printed information may be attached to a work order at the dealership or such printed information may also be sent to a service department for troubleshooting assistance.

Figure 3:
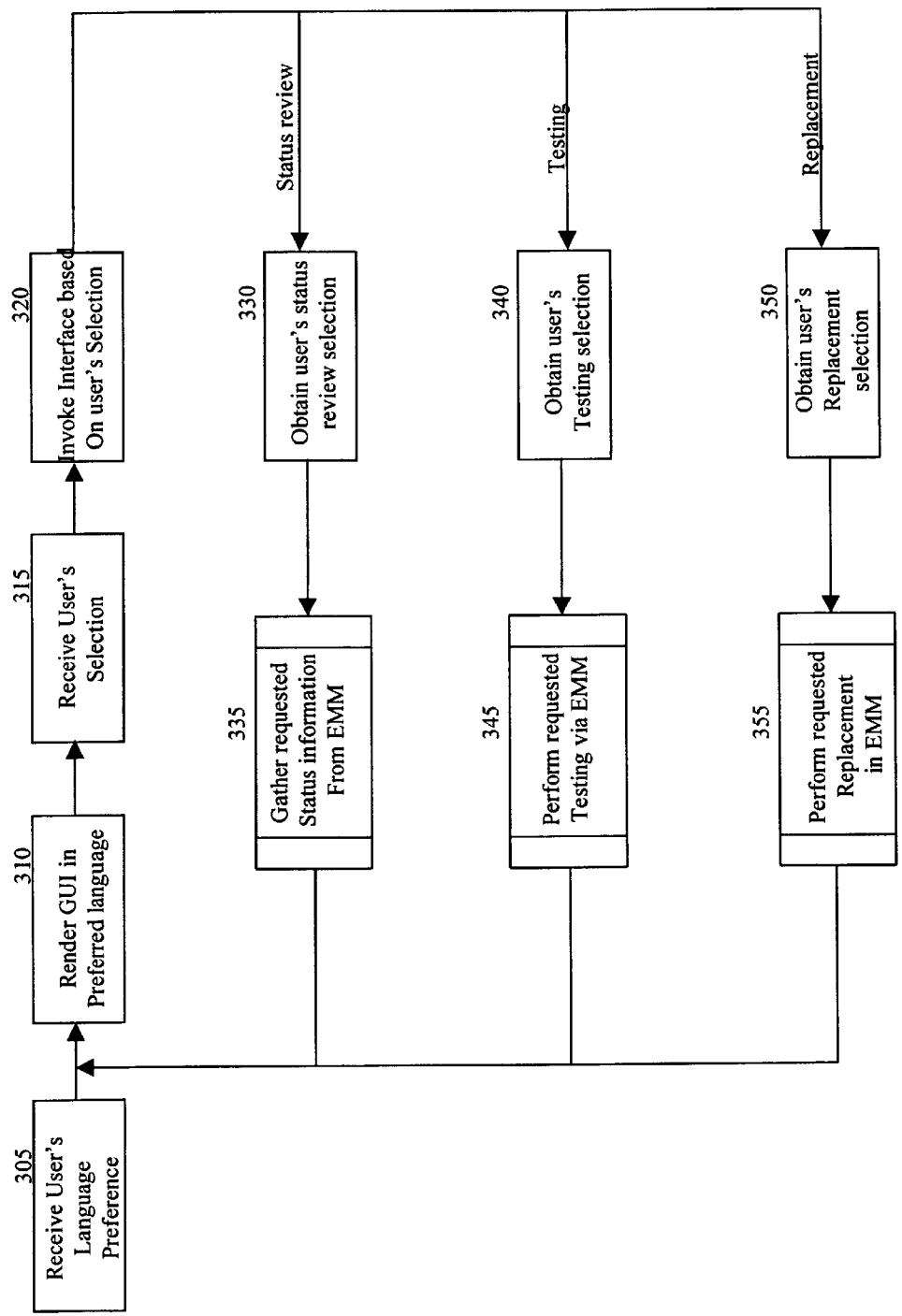
FIG. 3 is an exemplary flowchart of a process, in which an engine diagnostic system interacts with a user to perform engine diagnostic tasks, according to embodiments of the present invention.

FIG. 3 is an exemplary flowchart of a process according to embodiments of the present invention, in which the engine diagnostic system 150 interacts with a user to perform engine diagnostic tasks. The user's language preference is first received at 305. Based on the user's language preference, the interface rendering mechanism 162 renders, at 310, the user graphical interface 166 in the preferred language using the language lookup tables 164. User's selection of diagnostic operations is then received at 315, based on which the engine diagnostic system 150 invokes, at 320, an appropriate mechanism to perform the user's selection of operation.

If the user's selection is status review, the status review mechanism 152 is invoked. The status review mechanism 152 then proceeds to obtain, at 330, the user's specific selection on what types of information to be reviewed. Based on the user's specification, the status review mechanism 152 gathers, at 335, the requested information from the EMM 145 and then goes back to act 310 to render such information in the preferred language. The detailed operations performed to gather requested information is further described in referring to FIG. 4.

If the user's selection is testing, the testing mechanism 154 is invoked. The testing mechanism 154 then proceeds to obtain, at 340, the user's specific selection on what types of testing is to be performed. Based on the user's specification, the testing mechanism 154 performs, at 345, the requested testing operation via the EMM 145 before returns to act 310 for next selection. The detailed operations to perform a testing is further described in referring to FIG. 5.

If the user's selection is for replacement, the replacement mechanism 158 is invoked. The replacement mechanism 158 then proceeds to obtain, at 350, the user's specific selection on what types of replacement are to be performed. Based on the user's specification, the replacement mechanism 158 performs, at 335, the requested replacement operation before goes back to act 310 for the next selection of operation. The detailed operations performed to perform a replacement operation is further described in referring to FIG. 6.

Figure 4:
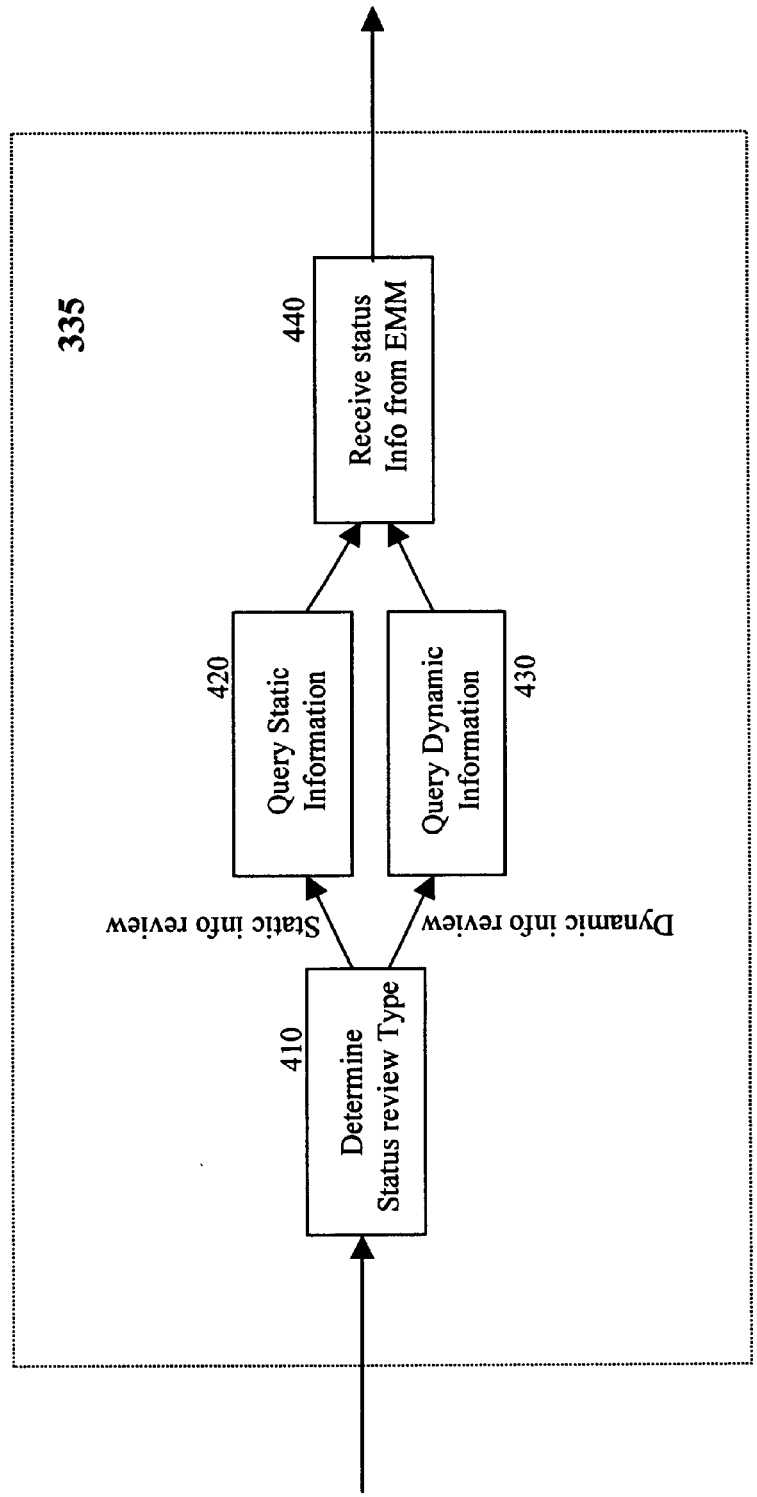
FIG. 4 is an exemplary flowchart of a process, in which a status review mechanism of an engine diagnostic system displays engine information based on user's choice, according to embodiments of the present invention.

FIG. 4 is an exemplary flowchart of a process according to embodiments of the present invention, in which the status review mechanism 152 gathers engine status information based on user's choice. Upon obtaining the use's selection, the status review mechanism 152 determines, at 410, the specific type of status information that the user desires. If static status information is requested, the status review mechanism 152 constructs a query for the requested static information and sends the query, at 420, to the EMM 145. If dynamic information is requested, the status review mechanism 152 constructs a query for the requested dynamic information and sends the query, at 430, to the EMM 145. The query may be constructed according to the EMM interaction protocol 160. The status review mechanism 152 then receives, at 440, the requested information from the EMM 145.

Figure 5:
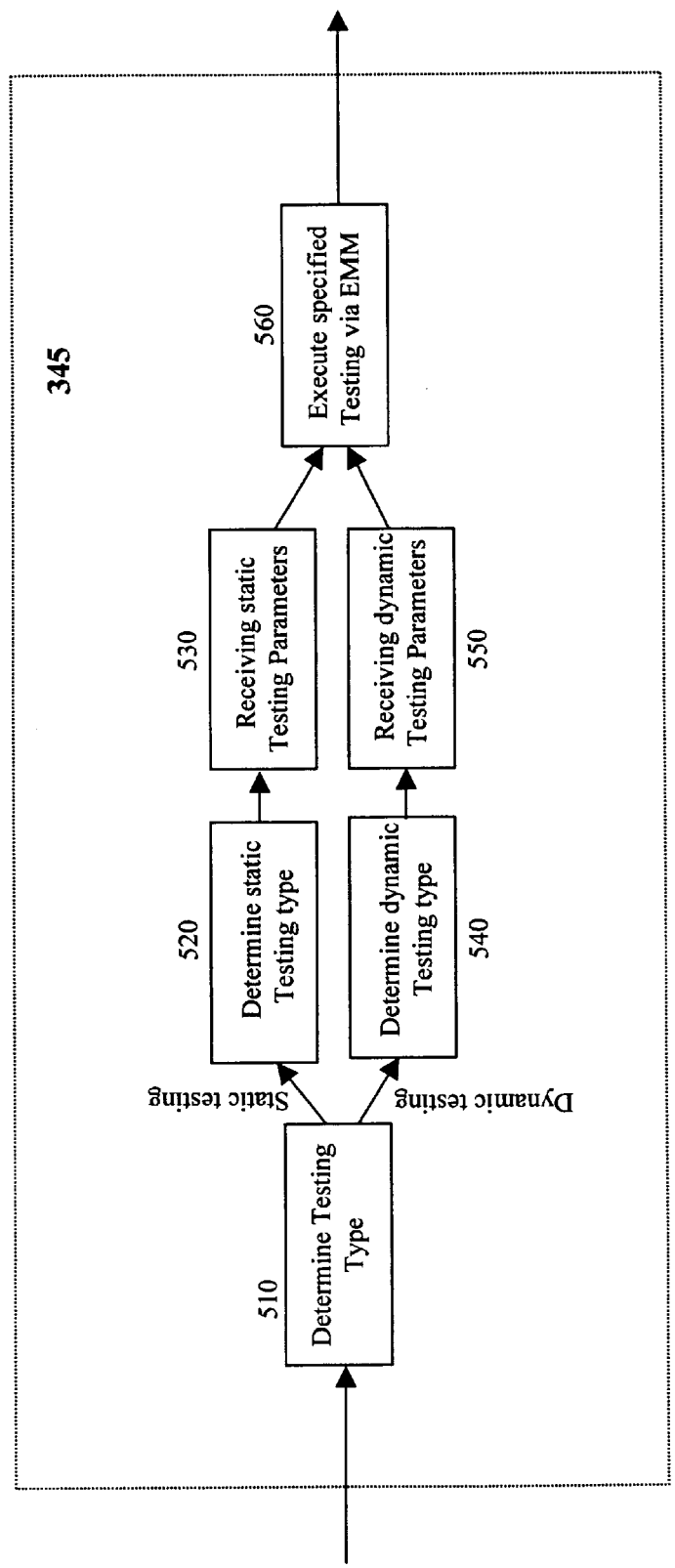
FIG. 5 is an exemplary flowchart of a process, in which a testing mechanism of an engine diagnostic system perform a user specified test on an engine, according to an embodiment of the present invention.

FIG. 5 is an exemplary flowchart of a process, in which the testing mechanism 154 performs the user specified test on the engine 110, according to an embodiment of the present invention. The testing type is first determined at 510, which is, according to the exemplary embodiments of the present invention, either a static testing or a dynamic testing. Static testing may refer to a test on the engine 110 that does not require that the engine 110 to be running. Dynamic testing may require that the underlying engine to be tested is running under certain conditions. The required conditions may vary depending on engine types.

If the requested testing is static testing, the testing mechanism 154 further determines, at 520, the specific type of static testing to be performed. As discussed with reference to FIG. 2, static testing may include a fuel injection test, an oil injector test, a fuel pump test, and an ignition firing test. The user 170 may make a selection via the user graphical interface 166. Based on the user's selection, the testing mechanism 154 may further acquire, at 530, relevant testing parameters from the user. Based on the testing parameters, the testing mechanism 154 interacts with the EMM 145 (e.g., sends the testing parameters to the EMM 145) to execute, at 560, the requested testing on the engine 110.

If the requested testing is a dynamic testing, the testing mechanism 154 further determines, at 540, the specific type of dynamic testing to be performed. As discussed with reference to FIG. 2, dynamic testing may include cylinder drop test or injector adjustment. The user 170 may make a selection via the user graphical interface 166. Based on the user's selection, the testing mechanism 154 may further acquire, at 550, relevant testing parameters from the user. Such parameters include which cylinder to drop and in what fashion, if a cylinder drop test is desired, or which injector to adjust, if an injector adjustment testing is requested. The testing mechanism 154 may display choices of cylinders or injectors and the user 170 may click on the one that is to undergo the testing.

Testing parameters may also include specifics such as how to adjust an injector. For example, the pulse width of an injector may be tuned up or down. The testing mechanism 154 may present different parametric options to the user graphically so that the user 170 can adjust the parameters through a graphical interface. For instance, the testing mechanism 154 may render (or invoke the interface rendering mechanism 162 to render) up and down visual buttons so that the user 170 may simply click on the button to scale up or down the pulse width of a chosen injector. Based on the user specified testing parameters, the testing mechanism 154 interacts with the EMM 145 to execute, at 560, the requested testing on the engine 110.

Figure 6:
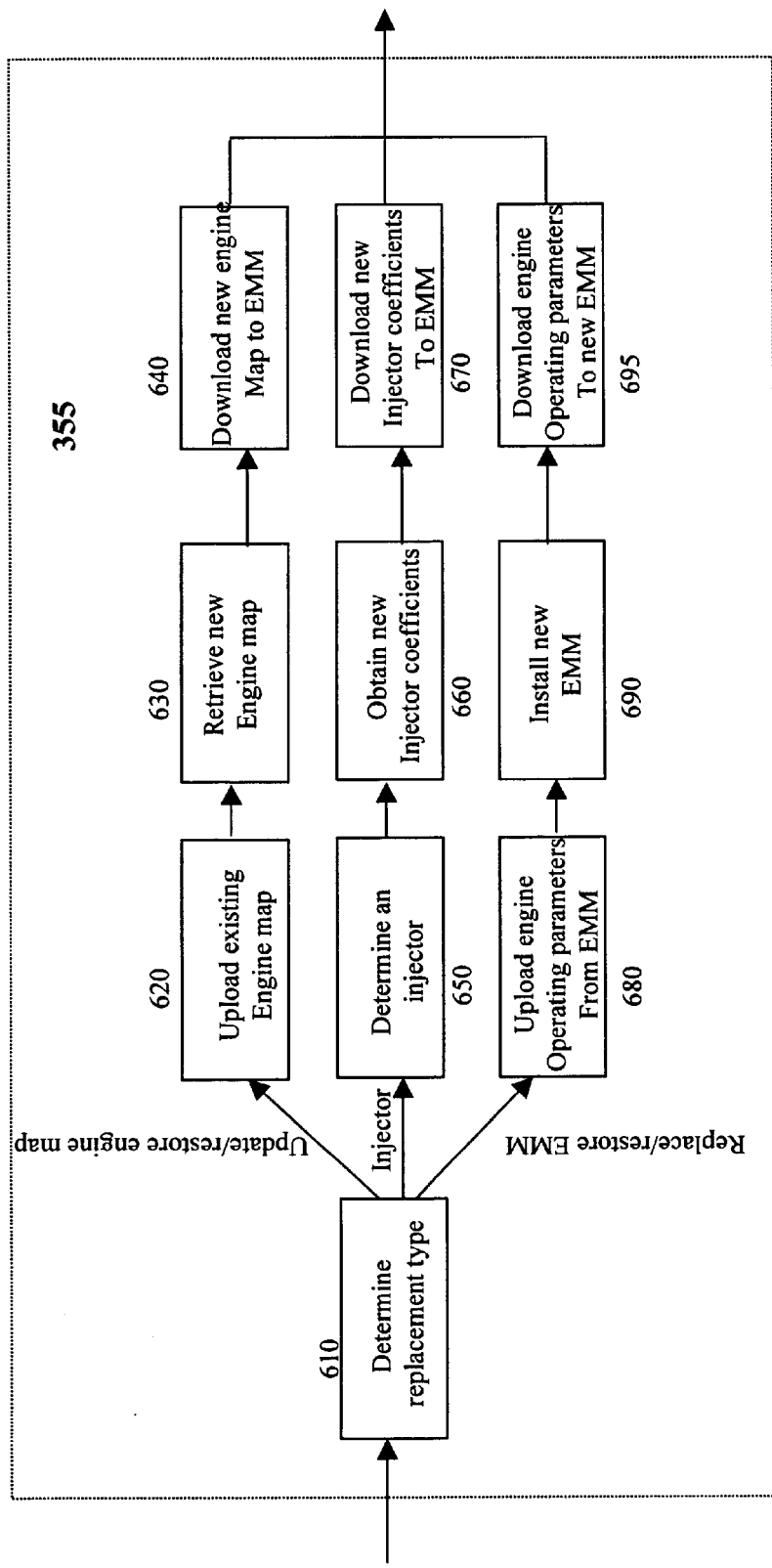
FIG. 6 is an exemplary flowchart of process, in which a replacement mechanism of an engine diagnostic system performs replacement of an engine component based on a user's choice, according to an embodiment of the present invention.

FIG. 6 is an exemplary flowchart of a process, in which the replacement mechanism 158 performs replacement operation on a selected engine component based on a user's choice, according to an embodiment of the present invention. The user's choice on terms of on which component the replacement is to be performed is first determined at 610. This may include replacing an injector or updating the existing engine map. Since a replaced component may be restored when necessary, the restore operation may also be processed as a replacement operation.

If the requested operation is to update an existing engine map, the replacement mechanism 158 invokes the dealer port 168 to retrieve, at 630, a new engine map. Map update is an operation that allows the user 170 to load an EMM with the latest EPA approved engine map. Such latest EPA approved engine maps may be made accessed via the dealer port 168. For example, the dealer port 168 may be constructed to query the dealer 180 for information regarding the engine whose engine map is to be updated. Once a map is selected it is transferred to the dealer's computer. If the latest engine map is available in the dealer's computer, the dealer port 168 transfers the new engine map, through, for example, a hot sync, to the engine diagnostic system 150.

The replacement mechanism 158 then uploads, at 620, the existing engine map (operational parameters) from the EMM 145. The uploaded map is stored in the engine diagnostic system 150. Such stored information may be retrieved when the map needs to be restored. The new engine map is then downloaded, at 640, to the EMM 145.

The engine update may not be allowed if the engine properties do not conform to the new map properties. The replacement mechanism 158 may enforce a check to see whether the engine properties are consistent with the new map properties. During a map update operation, a small counter may be displayed in the user graphical interface with instructions displayed allowing the user 170 to, for example, verify the update operation as well as timing. In addition, the replacement mechanism 158 may also support a recovery method in case of failure.

The update to the engine will not be allowed if the engine properties do not conform with the new map properties. During the map update, a small counter will be displayed in the screen corner. Instructions may be displayed for further information on verifying update and timing verification. With the current methods of updating maps, a recovery method may be built in incase of update failure.

If the requested operation is to replace an injector, the replacement mechanism 158 first asks the user 170 to select, at 650, the injector that is to be replaced. An injector replacement menu may be displayed that allows the user 170 to select a replacement injector serial number from, for example, a list of available injectors. The selection operation may also be used for restoring an injector. In this case, the user 170 may simply select the injector that is previously replaced and is not being restored.

Replacing an injector starts as soon as a serial number is selected from the list. The next interface (not shown) may show each and every cylinder with its injector serial number installed in that cylinder. Prior to replacing an injector, the replacement mechanism 158 may verify that the serial numbers displayed match with the serial numbers installed. The user 170 may then select the cylinder on the interface that is to be replaced. Once selected, the serial number may be displayed and the user 170 may be prompted for confirmation. After the conformation, the user 170 may be instructed to install the injector and at the same time the new serial number may be displayed in the interface.

Restoring an injector may be treated as an injector replacement operation. The replacement mechanism 158 may provide an addition icon so that the user 170 may select the operation when needed. If the user 170 selects to restore an injector, the replacement mechanism 158 retrieves the engine serial number and compares it to that of the information in the database where all the parameters are stored. If a serial number of an injector matches that of the engine, the replacement mechanism 158 may inform the user 170 that the original injector may be restored. Providing a separate icon for restoring operation prevents confusion between the replacement and restoring operations.

Once the new injector is installed, the replacement mechanism 158 then retrieves, at 660, corresponding new injector coefficients. Such retrieved new injector coefficients are then downloaded, at 670, to the EMM 145 to replace the existing injector coefficients. As discussed earlier, such coefficients control how an underlying injector behaves.

If the requested operation is to replace an existing EMM, the replacement mechanism 158 first uploads, at 680, all the engine operating parameters currently stored in the existing EMM. Such uploaded parameters are temporarily stored in the engine diagnostic system 150. The new EMM is then installed at 690. With the newly installed EMM, the engine diagnostic system 150 then downloads, at 695, the uploaded engine operating parameters into the new EMM.

Figure 7A:
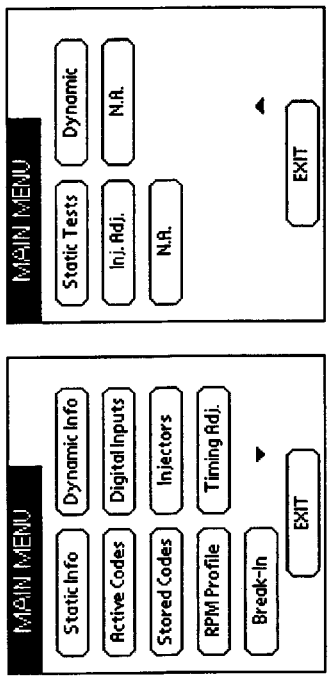
FIGS. 7(a)–7(b) illustrate exemplary graphical user interfaces displaying main menu of an engine diagnostic system, according to an embodiment of the present invention.
Figure 7B:
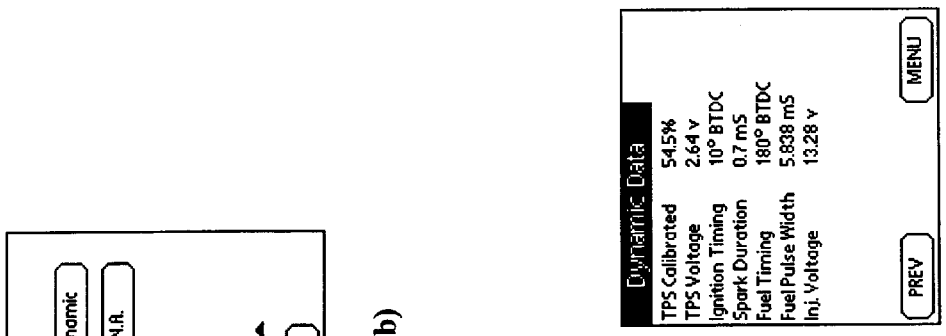

FIGS. 7(*a*)–7(*b*) illustrate exemplary graphical user interfaces displaying main menus of the engine diagnostic system 100, according to an embodiment of the present invention. In FIGS. 7(*a*) and 7(*b*) presented a list of optional functionalities facilitated by the engine diagnostic system 150. The icons depicted in FIGS. 7(*a*) and 7(*b*) are text based and the text may be displayed in a preferred language selected. For example, a preferred language can be English (as depicted in FIGS. 7(*a*) and 7(*b*)), French, Spanish, Portuguese, German, Swedish, Finnish, Italian, or Japanese. Each icon may have a navigation key implemented to associate with a particular functionality so that appropriate mechanism may be invoked when the corresponding icon is selected through either a click or a touch. In FIGS. 7(*a*)–7(*b*), the functionalities listed in the main menu includes, for example, static information review, dynamic information review, RPM profile, static tests, dynamic tests, and injector adjustment. The user 170 may select any one of the functionalities via this interface.

Figure 8A:
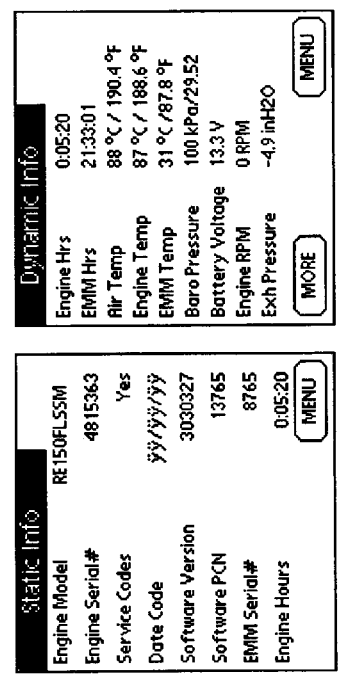
FIGS. 8(a)–8(c) show exemplary graphical user interfaces for reviewing engine status information, according to an embodiment of the present invention.
Figure 8B:
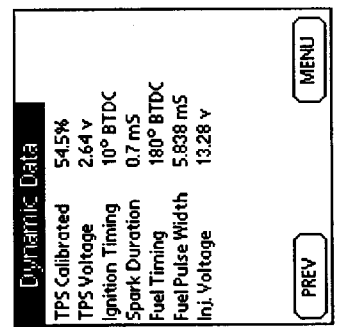
Figure 8C:
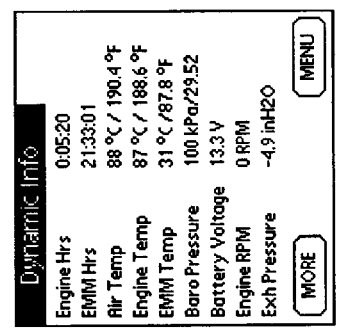

FIGS. 8(*a*)–8(*c*) show exemplary graphical user interfaces for reviewing different kinds of engine status information, according to an embodiment of the present invention. FIG. 8(*a*) illustrates an exemplary user graphical interface in which static status information about the engine 110 is displayed. For example, such static information includes the engine model (RE150FLSSM), the engine serial number (4815363), the service codes, the date code, the software version (3030327), the EMM serial number (8765), and the engine hours. There is a menu icon through which the user 170 may go back to a menu page such as the illustrated in FIG. 7(*a*). The status review mechanism 152 queries static status information from the EMM 145.

FIG. 8(*b*) illustrates a user graphical interface in which dynamic status information about a running engine is shown. Dynamic status information includes, for example, the air temperature, the engine temperature, the baro pressure, or the battery voltage. As shown in FIG. 8(*b*), an icon with text "more" may be displayed, indicating that there is more information in the same category to be displayed but the current page can hold only certain amount. Such an icon is provided so that the user 170 can touch the icon to continue viewing the remaining information. Similarly, the icon with text "menu" is where a user can go back to a menu. FIG. 8(*c*) illustrates what a continuing page for dynamic information may look like. Besides listing remaining of the information, an icon with text "prev" is displayed through which a user may go back to a previous page of information. At the same time, a menu icon is also provided so that a user may directly go back to a menu page without having to go back to the previous pages. Similar to the static status information, dynamic information is obtained by the status review mechanism 152 from the EMM 145 through query.

Figures 9A, 9B, 9C:
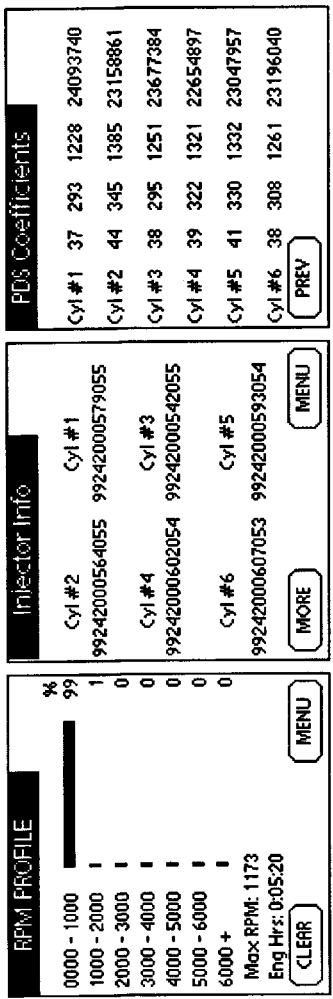
FIG. 9(a) illustrates an exemplary graphical user interface, in which rotation per minute profile of an engine is displayed, according to an embodiment of the present invention.
FIGS. 9(b)–9(c) show exemplary graphical user interfaces displaying information about individual injectors associate with an engine, according to an embodiment of the present invention.
Figure 10D:
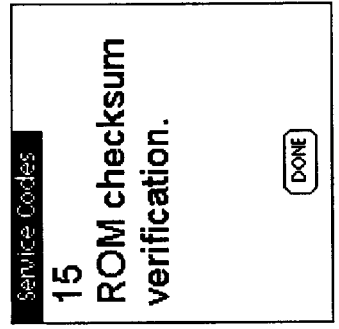
FIGS. 10(a)–10(d) show exemplary graphical user interfaces through which a user can make selections to review more detailed explanation about a particular piece of information, according to an embodiment of the present invention.
Figure 10C:
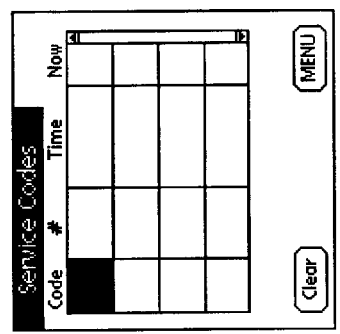
Figure 10B:
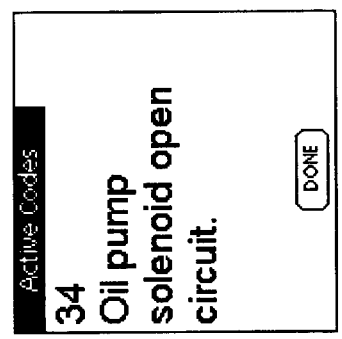
Figure 10A:
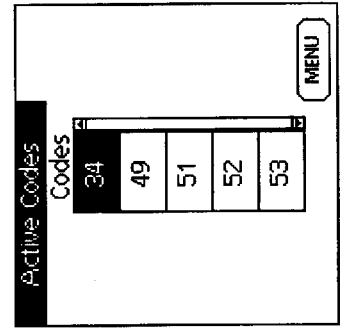

FIG. 9(*a*) shows an exemplary graphical user interface, in which the RPM profile of an engine is displayed, according to an embodiment of the present invention. In FIG. 9(*a*), the information about an engine's RPM operational history is displayed in a bar graph form with respect to a particular RPM profile with a plurality of categories, each of which corresponding to certain range of RPMs. For example, the first category of RPM corresponds to RPM below 1000. The second category corresponds to RPMs above 1000 and below 2000, etc. Each category may be associated with certain engine models. For example, newer engine models may have better resolution of RPM ranges.

To acquire RPM profile information, the status review mechanism 152 query the EMM 145 to obtain, for example, the maximum RPM stored in the EMM 145. Other relevant information displayed in interface shown in FIG. 9(*a*) is also from the EMM 145. As discussed earlier, depending on the user of the engine diagnostic system 150, the functionalities available to the user may vary. For example, the icon with text "clear" in FIG. 9(*a*) may appear only when the user 170 is a licensed dealer. This icon enables the user to clear the existing RPM profile from the memory of EMM 145. Since such a functionality may permanently change the content within the EMM 145, it may be authorized only to such users who have the authority to do so.

FIGS. 9(*b*)–9(*c*) show exemplary graphical user interfaces that display information about individual injectors, according to an embodiment of the present invention. FIG. 9(*b*) illustrates how injector serial numbers may be displayed, in which the serial number for each of six injectors, associated with six cylinders, individually, is displayed under each corresponding cylinder. The cylinders may be displayed in a way that is consistent with their physical configuration within the engine 110. That is, the engine diagnostic system 100 may display the configuration of cylinders according to the actual arrangement within the engine. For example, if there are four cylinders in an engine, the engine diagnostic system 100 displays only 4 cylinders with spatial relationship that is how they are related in the engine.

FIG. 9(*c*) is another interface that display injector information. It may be designed as a continuing interface from the one shown in FIG. 9(*b*). When a user touch the icon with text "more" in the interface illustrated in FIG. 9(*b*), it sends a request for reviewing the injectors' coefficients. In this case, the status review mechanism 152 may forward a query to the EMM 145 and receive the injectors' coefficients from the EMM 145. The coefficients of each injector are displayed in FIG. 9(*c*) with respect to its associated cylinder. For example, the injector associated with the first cylinder has coefficients 37 293 128 and 24093740. Such coefficients determine a third-order polynomial function that governs the operational behavior of the underlying injector.

FIGS. 10(*a*)–10(*d*) show exemplary graphical user interfaces through which a user can make selections to review more detailed description or explanation about a diagnostic code, according to an embodiment of the present invention. In FIG. 10(*a*), a list of diagnostic codes is displayed. Each code may indicate some trouble shooting problem. Since from the codes it may not be clear to a user what exactly the problem is, the user may simply select a particular code and asks for detailed description of the problem. For example, in FIG. 10(*a*), diagnostic code 34 is chosen and it invokes a subsequent display, illustrated in FIG. 10(*b*), that provides a detailed definition about the underlying problem. For instance, according to the example in FIG. 10(*a*), the diagnostic code 34 corresponds to a problem related to oil pump solenoid open circuit.

In FIG. 10(*c*), a table of service codes is shown. Similarly, to review the detailed meaning of a particular service code, a user may select the code under question, which invokes a subsequent display, illustrated in FIG. 10(*d*), that provide the explanation of the meaning of the selected service code (ROM checksum verification).

Figure 11:
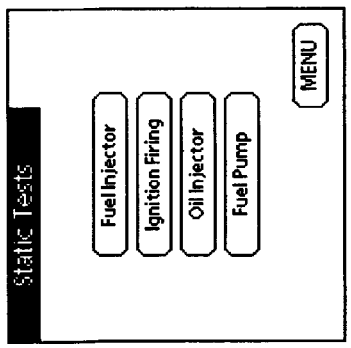
FIG. 11 illustrates an exemplary graphical user interface that displays a menu of choices for static testing operations that can be performed on an engine via an engine diagnostic system, according to an embodiment of the present invention.

FIG. 11 illustrates an exemplary graphical user interface that displays a menu of choices for static testing operations that can be performed on the engine 110 via the engine diagnostic system 150, according to an embodiment of the present invention. In the exemplary interface, four options of static testing are displayed, corresponding to fuel injector test, ignition firing test, oil injector test, and fuel pump test.

To perform a fuel injector test, the user 170 selects the icon with text "fuel injector." To select a specific injector, the engine diagnostic system 150 may dis(not shown) play all the cylinders in a configuration consistent with their actually arrangement in the engine 110 and allows the user 170 to select one corresponding to the injector to be tested on. If the engine 110 is running, the engine diagnostic system 150 may display a warning message indicating that the requested test can not proceed with an running engine.

During the fuel injector test, the engine diagnostic system 150 may display a message reporting the specifics regarding the test. For example, it may report the duration of the test such as the selected injector will fire approximately one time per second for a duration of ten seconds. Upon the completion of the predetermined test, the screen may return to the injector selection screen.

To perform an ignition test, the user 170 may simply select the "ignition firing" button, which may bring about a similar interface (not shown) that allows the user 170 to select a particular injector to be tested on. The user 170 may be required to connect a plug wire to a spark tester and then to select an ignition coil to fire. During the test, a message regarding the duration of the test may be displayed in a similar fashion as for a fuel injector test (previously discussed). For example, a single test may run for 10 seconds or until any key is pressed on the interface to cancel the test.

To perform an oil injector test, the user 170 select the icon with text "Oil Injector". To start an oil injector test, the user 170 may be prompted to select "Continue" to begin the test. Once "Continue" is clicked, a counter may count down with a predetermined duration (e.g., 10 second). The test may also be terminated whenever the user 170 touches a "cancel" icon (not shown). During an oil injector test, the injector under test may be made to pulse approximately once per second. The fuel pump test may be performed in a similar fashion but with a 10 second "constant on" duration.

Figure 12D:
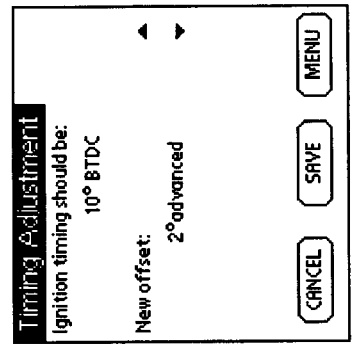
FIGS. 12(a)–12(d) show exemplary graphical user interfaces that facilitate various dynamic testing operations, according to embodiments of the present invention.
Figure 12C:
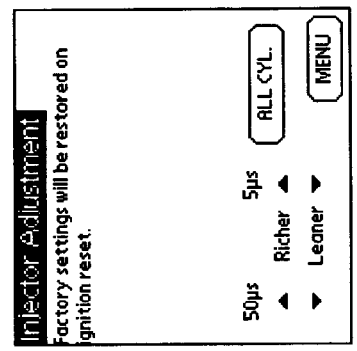
Figure 12B:
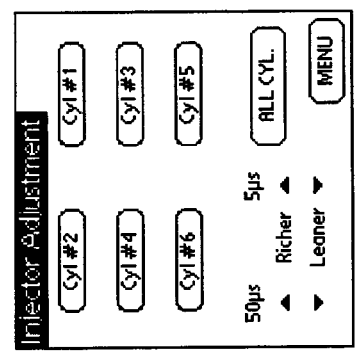
Figure 12A:
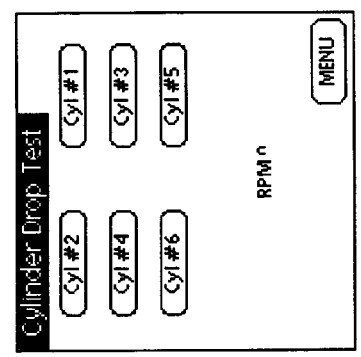

FIGS. 12(a)–12(d) show exemplary graphical user interfaces that facilitate various dynamic testing operations, according to embodiments of the present invention. FIG. 12(a) illustrates an interface through which the user 170 may select particular cylinder(s) for a cylinder drop test. In FIG. 12(a), six cylinders are displayed. The user 70 can either select cylinders manually by touch on the corresponding icons or select an "Auto" icon (not shown). When an automatic drop is selected, the engine diagnostic system 15 may automatically drop cylinders, one at a time, with an appropriate interval between individual drops, and then record associated RPM drop.

To facilitate the user 170, the engine diagnostic system 150 may highlight the selected cylinder(s) with appropriate color. In the "Auto" mode, the engine diagnostic system 150 may control an appropriate recovery interval between cylinder cutouts to allow the engine 110 to stabilize before another injector is dropped. The test results may be displayed next to the associated cylinder (not shown). If a manual mode where the dropping cylinder (or cylinders) is manually selected, a selected injector may be dropped if the user 170 specifies so.

FIG. 12(b) illustrates an interface corresponding to a dynamic test called injector adjustment. Injector adjustment provides a dealer a method to trouble shooting an improper combustion in a cylinder. To allow the user 170 to select an injector for adjustment, individual cylinders may be displayed and the user 170 may simply touch the icon representing the cylinder whose injector is to be adjusted. The user 170 may also choose a plurality of injectors to make adjustment. To select all injectors, the user 170 may simply touch the icon with text "all".

To specify the desired amount of adjustment, the user may touch icon "▲" for richer or icon "▼" for leaner, representing the adjustment icons. Touching "richer" icon indicates to increase the pulse width of the selected injectors and touching "leaner" icon indicates to decrease the pulse width of the selected injectors. Each of the two adjustment icons may be associated with certain adjustment amount on each touch. For example, each touch may correspond to an adjustment of 5 microsecond or 50 microseconds. The user 170 may specify the desired adjustment resolution by selecting either symbol 5 $\mu$s or symbol 50 $\mu$s on the interface illustrated in FIG. 12(b).

As the user 170 touch either the "richer" or the "leaner" icon, the adjustment is instantaneous. The adjustment is received by the testing mechanism 154 and sent to the EMM 145 to control the engine 110. The adjustment may be made either before the engine 110 is started or while it is running. Adjustments may be limited with respect to the engine's RPM to prevent engine failure. For example, the limitation may be that if the engine 110 is running in a homogenous mode, the adjustment limit is 200 $\mu$s. If the engine is running in stratified mode, the limit is 400 $\mu$s. Once the test is ended (ignition key switch is turned off), the original factory fuel flow settings may be automatically restored. This illustrated in FIG. 12(c), in which a message about the restoration of the original factory setting is displayed.

FIG. 12(d) shows an exemplary interface through which the user 170 may adjust timing. Preferred ignition timing (10° BTDC) is indicated and a current offset value (2° advanced) is also indicated. The user may accordingly adjust the timing against the preferred ignition timing by appropriately touching either a "▲" icon (to increase) or a "▼" icon (to decrease).

Figure 13:
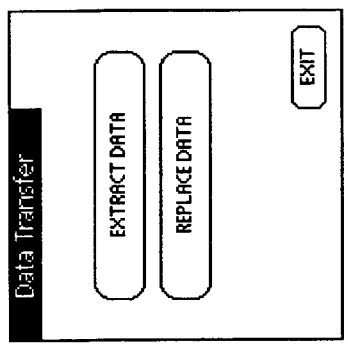
FIG. 13 illustrates an exemplary graphical user interface for replacement operations, according to embodiments of the present invention.

FIG. 13 illustrates an exemplary graphical user interface for data transfer when an existing EMM is to be replaced, according to embodiments of the present invention. In FIG. 13, the illustrated interface displays the operations required for the EMM replacement operation. The first required operation is to upload the engines operating parameters into the engine diagnostic system 150. To start this operation, the user 170 simply selects the "Extract Data" icon. When the upload is complete, the used will be notified. Uploaded data will remain in an encrypted form in the engine diagnostic system 150.

The second required operation is to download all of the operating parameters to the underlying new EMM. This is achieved by selecting the "Replace Data" icon. The engine diagnostic system 150 may enforce the correct order of the two operations by requiring that "Extract Data" must be performed prior to "Replace Data". When replacement is completed, the user 170 may touch icon "Cancel" to return to the main menu.

Figure 14A:
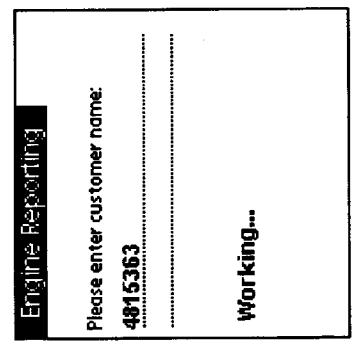

FIGS. 14(a)–4(b) show exemplary graphical user interfaces for EMM reporting, according to an embodiment of the present invention. The user 170 may select to generate a report via the graphical user interface 166. In FIG. 14(a), the icon with text "Write Report" allows the user 170 to save static information into a file. The user 170 may also enter an appropriate customer's identification to be attached to the report. For example, in a service department, each work order may be associated with a particular customer. The information acquired from the EMM 145, which reveals the status of the engine that is being served, may be used to generate an engine status report for the customer and such a report may be identified based on the customer's identification. Such identification may be the engine serial number, customer's phone number, or simply customer's name.

Figure 14B:
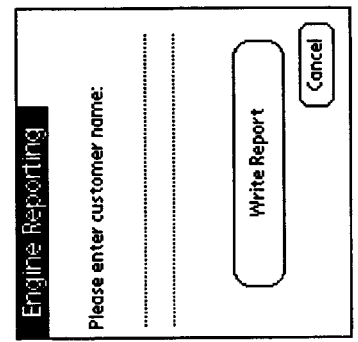

As discussed earlier, the reporting mechanism 165 is responsible for generating a report. It may obtain the user's specification in terms of generating a report and the customer's identification. The reporting mechanism 165 may then store the engine status information in a file, connect to the printing mechanism 183 in the host system of the dealer 180 to generate a printed report. While acquiring engine information, the reporting mechanism 165 may accordingly display, on the graphical user interface 166 (as shown in FIG. 14(*b*)), the customer's identification and indicating that the report generation is in working progress.

While the invention has been described with reference to the certain illustrated embodiments, the words that have been used herein are words of description, rather than words of limitation. Changes may be made, within the purview of the appended claims, without departing from the scope and spirit of the invention in its aspects. Although the invention has been described herein with reference to particular structures, acts, and materials, the invention is not to be limited to the particulars disclosed, but rather extends to all equivalent structures, acts, and, materials, such as are within the scope of the appended claims.

What is claimed is:

1. A method, comprising:
   presenting, by an engine diagnostic system, a menu to a user with a plurality of options related to engine diagnostic operations through a user graphical interface displayed on a touch-responsive, handheld PDA on which the engine diagnostic system is realized wherein the PDA is in connection with an engine management mechanism of an engine;
   receiving, from the user through interaction with the menu displayed on the touch-responsive, handheld PDA, a selected engine diagnostic operation to be performed with respect to the engine; and
   performing, by the engine diagnostic system through the engine management mechanism of the engine, the selected engine diagnostic operation, wherein performing the selected engine diagnostic operation comprises executing a status review if the selected engine diagnostic operation is a status review operation, executing an engine testing if the selected engine diagnostic operation is an engine testing operation, and executing a replacement if the selected engine diagnostic operation is a replacement operation.

2. The method according to claim 1, wherein presenting the menu includes presenting the menu in a preferred language specified by the user.

3. The method according to claim 2, wherein the preferred language includes at least one of:
   English;
   French;
   Italian;
   Spanish;
   German;
   Swedish;
   Portuguese;
   Finnish; and
   Japanese.

4. The method according to claim 3, wherein the plurality of options related to engine diagnostic operations includes at least one of:
   a status review operation;
   a testing operation;
   an adjustment operation; and
   a replacement operation.

5. The method according to claim 4, wherein the status review operation includes at least one of:
   a static status information review operation that queries static status information related to the engine; and
   a dynamic status information review operation that queries dynamic status information related to the engine.

6. The method according to claim 5, wherein the static status information includes at least one of:
   model of the engine;
   serial number of the engine;
   an engine map of the engine; and
   hours of use of the engine.

7. The method according to claim 5, wherein the dynamic status information includes at least one of:
   rotation per minute profile of the engine;
   injector information associated with at least one cylinder of the engine;
   timing information for the engine; and
   powerhead break-in information for the engine.

8. The method according to claim 4, wherein the testing operation includes at least one of:
   a static testing operation; and
   a dynamic testing operation.

9. The method according to claim 8, wherein the static testing operation includes at least one of:
   a fuel injector test;
   an oil injector test;
   a fuel pump test; and
   an ignition firing test.

10. The method according to claim 8, wherein the dynamic testing operation includes at least one of:
    a cylinder drop test; and
    an injector adjustment test.

11. A method, comprising:
    presenting, by an engine diagnostic system, a menu to a user with a plurality of options related to engine diagnostic operations through a user graphical interface displayed on a PDA on which the engine diagnostic system is realized wherein the PDA is in connection with an engine management mechanism of an engine;
    receiving, from the user, a selected engine diagnostic operation to be performed with respect to the engine; and
    performing, by the engine diagnostic system through the engine management mechanism of the engine, the selected engine diagnostic operation,
    wherein presenting the menu includes presenting the menu in a preferred language specified by the user including at least one of English, French, Italian, Spanish, German, Swedish, Portuguese, Finnish, and Japanese,
    wherein the plurality of options related to engine diagnostic operations includes at least one of a status review operation, a testing operation, an adjustment operation, and a replacement operation,
       wherein the replacement operation include at least one of an engine map update operation, an injector replacement operation, and an engine management mechanism replacement operation, and wherein performing the selected engine diagnostic operation comprises executing a status review if the selected engine diagnostic operation is a status review operation, executing an engine testing if the selected engine diagnostic operation is an engine testing operation, and executing a replacement if the selected engine diagnostic operation is a replacement operation.

12. The method according to claim 11, wherein executing the status review comprises:

obtaining the user's selection of a type of status information to be reviewed via the user graphical interface;

querying the engine management mechanism for static status information of the engine if the user's selection is a static status information review;

querying the engine management mechanism for dynamic status information of the engine if the user's selection is a dynamic information review;

receiving queried information from the engine management mechanism; and displaying the queried information on the user graphical interface in the preferred language.

13. The method according to claim 11, wherein executing the engine testing comprises:

obtaining the user's selection of a type of test to be performed via the user graphical interface;

obtaining static engine testing parameters related to the type of static test to be performed on the engine if the user's selection is static testing;

acquiring dynamic testing parameters related to the type of dynamic test to be performed on the engine if the user's selection is dynamic testing; and carrying out the type of test, selected by the user, via the engine management mechanism based on the testing parameters.

14. The method according to claim 11, wherein executing the replacement comprises:

obtaining the user's selection of the type of replacement to be performed via the user graphical interface;

performing replacement of an engine map stored in the engine management mechanism if the user's selection is to replace the engine map;

performing replacement of an injector if the user's selection is to replace the injector; and performing replacement of the engine management mechanism if the user's selection is to replace the engine management mechanism.

15. The method according to claim 14, wherein performing the replacement of the engine map comprises:

retrieving, by the engine diagnostic system, a new engine map from an authorized location;

uploading the engine map from the engine management mechanism to the engine diagnostic system; and downloading the new engine map to the engine management mechanism.

16. The method according to claim 14, wherein performing the replacement of injector comprises:

determining, by the user, an injector to be replaced via the user graphical interface;

obtaining, by the engine diagnostic system, new injector coefficients for the injector to be replaced; and downloading the new injector coefficients to the engine management mechanism.

17. The method according to claim 14, wherein performing the replacement of the engine management mechanism comprises:

uploading engine operating parameters from the engine management mechanism to the engine diagnostic system;

installing a new engine management mechanism; and downloading the engine operating parameters from the engine diagnostic system to the new engine management mechanism.

18. A method, comprising:

presenting, by an engine diagnostic system, a menu to a user with a plurality of options related to engine diagnostic operations through a user graphical interface displayed on a personal computer on which the engine diagnostic system is realized wherein the personal computer is in connection with an engine management mechanism of an engine;

receiving, from the user, a selected engine diagnostic operation to be performed with respect to the engine; and performing, by the engine diagnostic system through the engine management mechanism of the engine, the selected engine diagnostic operation, wherein the plurality of options related to engine diagnostic operations includes at least one of a status review operation, a testing operation, an adjustment operation, and a replacement operation, wherein the replacement operation includes at least one of an engine map update operation, an injector replacement operation, and an engine management mechanism replacement operation, and wherein performing the selected engine diagnostic operation comprises executing a status review if the selected engine diagnostic operation is a status review operation, executing an engine testing if the selected engine diagnostic operation is an engine testing operation, and executing a replacement if the selected engine diagnostic operation is a replacement operation.

19. The method according to claim 18, wherein presenting the menu includes presenting the menu in a preferred language specified by the user.

20. The method according to claim 18, wherein the status review operation includes at least one of:

a static status information review operation that queries static status information related to the engine; and a dynamic status information review operation that queries dynamic status information related to the engine.

21. The method according to claim 18, wherein the testing operation includes at least one of:

a static testing operation; and a dynamic testing operation.

22. The method according to claim 18, wherein executing the status review comprises:

obtaining the user's selection of the type of status information to be reviewed via the user graphical interface;

querying the engine management mechanism for static status information of the engine if the user's selection is static status information review;

querying the engine management mechanism for dynamic status information of the engine if the user's selection is dynamic information review;

receiving queried information from the engine management mechanism; and displaying the queried information on the user graphical interface in the preferred language.

23. The method according to claim 18, wherein executing the engine testing comprises:
   obtaining the user's selection of the type of test to be performed via the user graphical interface;
   obtaining static engine testing parameters related to the type of static test to be performed on the engine if the user's selection is static testing;
   acquiring dynamic testing parameters related to the type of dynamic test to be performed on the engine if the user's selection is dynamic testing; and
   carrying out the type of test, selected by the user, via the engine management mechanism based on the testing parameters.

24. The method according to claim 18, wherein executing the replacement comprises:
   obtaining the user's selection of the type of replacement to be performed via the user graphical interface;
   performing replacement of an engine map stored in the engine management mechanism if the user's selection is to replace the engine map;
   performing replacement of an injector if the user's selection is to replace the injector; and
   performing replacement of the engine management mechanism if the user's selection is to replace the engine management mechanism.

25. A system, comprising:
   an engine with a plurality of cylinders, each of which has an associated injector;
   an engine management mechanism for managing the engine's operating parameters that control the engine's operations and for managing information related to the engine's operational status;
   an engine diagnostic system for providing engine diagnostic related functionalities through the engine management mechanism;
   a user graphical interface for interacting with a user to allow the user to select a desired diagnostic functionality to be performed and to specify parameters used in performing the desired diagnostic function;
   a status review mechanism for providing the functionality of reviewing static and dynamic status information of the engine, if the desired diagnostic functionality, selected by the user, is to review status information;
   a testing mechanism for providing the functionality of performing static and dynamic testing on the engine, if the desired diagnostic functionality is to test the engine;
   an adjustment mechanism for providing the functionality of adjusting the operating parameters of the engine, if the desired diagnostic functionality is to make adjustment of the engine's operating parameters; and
   a replacement mechanism for providing the functionality of replacing an existing part of the engine with a new part, if the desired diagnostic functionality is to replace the existing part.

26. The system according to claim 25, wherein the new part includes:
   an injector;
   an engine map; and
   an engine management mechanism.

27. The system according to claim 25, the engine diagnostic system further comprising:
   at least one language look up table for providing language look ups among different languages; and
   an interface rendering mechanism for generating the user graphical interface in pre-specified preferred languages based on the at least one language look up table.

28. The system according to claim 27, further comprising:
   a dealer port for facilitating the replacement mechanism to obtain a new engine map associate with an operation to replace an existing engine map with the new engine map.

29. The system according to claim 28, further comprising:
   a printing mechanism for facilitating the generation of a status report in printing, and
   an engine map storage for storing at least one engine map from where the dealer port accesses an updated engine map.

30. An engine diagnostic system, comprising:
   a user graphical interface for interacting with a user to allow the user to select a desired diagnostic functionality to be performed on an engine through an engine management mechanism and to specify parameters used in performing the desired diagnostic function;
   a status review mechanism for providing the functionality of reviewing static and dynamic status information of the engine, if the desired diagnostic functionality, selected by the user, is to review status information;
   a testing mechanism for providing the functionality of performing static and dynamic testing on the engine, if the desired diagnostic functionality is to test the engine;
   an adjustment mechanism for providing the functionality of adjusting the operating parameters of the engine, if the desired diagnostic functionality is to make adjustment of the engine's operating parameters; and
   a replacement mechanism for providing the functionality of replacing an existing part of the engine with a new part, if the desired diagnostic functionality is to replace the existing part.

31. The system according to claim 30, wherein the new part includes:
   an injector;
   an engine map; and
   an engine management mechanism.

32. The system according to claim 30, further comprising:
   at least one language look up table for providing language look ups among different languages; and
   an interface rendering mechanism for generating the user graphical interface in pre-specified preferred languages based on the at least one language look up table.

33. The system according to claim 32, further comprising:
   a dealer port for facilitating the replacement mechanism to obtain a new engine map associate with an operation to replace an existing engine map with the new engine map.

34. A machine-accessible medium encoded with data operable according to a method comprising:
   presenting, by an engine diagnostic system, a menu to a user with a plurality of options related to engine diagnostic operations through a user graphical interface displayed on a PDA on which the engine diagnostic system is realized wherein the PDA is in connection with an engine management mechanism of an engine;
   receiving, from the user, a selected engine diagnostic operation to be performed with respect to the engine; and
   performing, by the engine diagnostic system through the engine management mechanism of the engine, the selected engine diagnostic operation, wherein the plurality of options related to engine diagnostic operations includes at least one of a status review operation, a testing operation, an adjustment operation, and a replacement operation, wherein the replacement operation includes at least one of an engine map update operation, an injector replacement operation, and an engine management mechanism replacement operation, wherein performing the selected engine diagnostic operation comprises executing a status review if the selected engine diagnostic operation is a status review operation, executing an engine testing if the selected engine diagnostic operation is an engine testing operation, and executing a replacement if the selected engine diagnostic operation is a replacement operation.

35. The medium according to claim 34, wherein presenting the menu includes presenting the menu in a preferred language specified by the user.

36. The medium according to claim 34, wherein the status review operation includes at least one of:
   a static status information review operation that queries static status information related to the engine; and
   a dynamic status information review operation that queries dynamic status information related to the engine.

37. The medium according to claim 34, wherein the testing operation includes at least one of:
   a static testing operation; and
   a dynamic testing operation.

38. The medium according to claim 34, wherein executing the status review comprises:
   obtaining the user's selection of the type of status information to be reviewed via the user graphical interface;
   querying the engine management mechanism for static status information of the engine if the user's selection is static status information review;
   querying the engine management mechanism for dynamic status information of the engine if the user's selection is dynamic information review;
   receiving queried information from the engine management mechanism; and
   displaying the queried information on the user graphical interface in the preferred language.

39. The medium according to claim 34, wherein executing the engine testing comprises:
   obtaining the user's selection of the type of test to be performed via the user graphical interface;
   obtaining static engine testing parameters related to the type of static test to be performed on the engine if the user's selection is static testing;
   acquiring dynamic testing parameters related to the type of dynamic test to be performed on the engine if the user's selection is dynamic testing; and
   carrying out the type of test, selected by the user, via the engine management mechanism based on the testing parameters.

40. The medium according to claim 34, wherein executing the replacement comprises:
   obtaining the user's selection of the type of replacement to be performed via the user graphical interface;
   performing replacement of an engine map stored in the engine management mechanism if the user's selection is to replace the engine map;
   performing replacement of an injector if the user's selection is to replace the injector; and
   performing replacement of the engine management mechanism if the user's selection is to replace the engine management mechanism.

41. The medium according to claim 40, wherein performing the replacement of the engine map comprises:
   retrieving, by the engine diagnostic system, a new engine map from an authorized location;
   uploading the engine map from the engine management mechanism to the engine diagnostic system; and
   downloading the new engine map to the engine management mechanism.

42. The medium according to claim 41, wherein performing the replacement of injector comprises:
   determining, by the user, an injector to be replaced via the user graphical interface;
   obtaining, by the engine diagnostic system, new injector coefficients for the injector to be replaced; and
   downloading the new injector coefficients to the engine management mechanism.

43. The medium according to claim 41, wherein performing the replacement of the engine management mechanism comprises:
   uploading engine operating parameters from the engine management mechanism to the engine diagnostic system;
   installing a new engine management mechanism; and
   downloading the engine operating parameters from the engine diagnostic system to the new engine management mechanism.

44. A machine-accessible medium encoded with data operable according to a method comprising:
   presenting, by an engine diagnostic system, a menu to a user with a plurality of options related to engine diagnostic operations through a user graphical interface displayed on a personal computer on which the engine diagnostic system is realized wherein the personal computer is in connection with an engine management mechanism of an engine;
   receiving, from the user, a selected engine diagnostic operation to be performed with respect to the engine; and
   performing, by the engine diagnostic system through the engine management mechanism of the engine, the selected engine diagnostic operation,
   wherein the plurality of options related to the engine diagnostic operation includes at least one of a status review operation, a testing operation, an adjustment operation, and a replacement operation,
   wherein the replacement operation includes at least one of an engine map update operation, an injector replacement operation, and an engine management mechanism replacement operation, and
   wherein performing the selected engine diagnostic operation comprises executing a status review if the selected engine diagnostic operation is a status review operation, executing an engine testing if the selected engine diagnostic operation is an engine testing operation, and executing a replacement if the selected engine diagnostic operation is a replacement operation.

45. The medium according to claim 44, wherein presenting the menu includes presenting the menu in a preferred language specified by the user.

46. The medium according to claim 44, wherein the status review operation includes at least one of:

a static status information review operation that queries static status information related to the engine; and a dynamic status information review operation that queries dynamic status information related to the engine.

47. The medium according to claim 44, wherein the testing operation includes at least one of:

a static testing operation; and a dynamic testing operation.

48. The medium according to claim 44, wherein executing the status review comprises:

obtaining the user's selection of the type of status information to be reviewed via the user graphical interface;

querying the engine management mechanism for static status information of the engine if the user's selection is static a status information review;

querying the engine management mechanism for dynamic status information of the engine if the user's selection is a dynamic information review;

receiving queried information from the engine management mechanism; and displaying the queried information on the user graphical interface in the preferred language.

49. The medium according to claim 44, wherein executing the engine testing comprises:

obtaining the user's selection of the type of test to be performed via the user graphical interface;

obtaining static engine testing parameters related to the type of static test to be performed on the engine if the user's selection is static testing;

acquiring dynamic testing parameters related to the type of dynamic test to be performed on the engine if the user's selection is dynamic testing; and carrying out the type of test, selected by the user, via the engine management mechanism based on the testing parameters.

50. The medium according to claim 44, wherein executing the replacement comprises:

obtaining the user's selection of the type of replacement to be performed via the user graphical interface;

performing replacement of an engine map stored in the engine management mechanism if the user's selection is to replace the engine map;

performing replacement of an injector if the user's selection is to replace the injector; and performing replacement of the engine management mechanism if the user's selection is to replace the engine management mechanism.

* * * * *